US009759108B2

(12) United States Patent
Wikaryasz et al.

(10) Patent No.: US 9,759,108 B2
(45) Date of Patent: Sep. 12, 2017

(54) TRI-FLOW EXHAUST TREATMENT DEVICE WITH REDUCTANT MIXING TUBE

(71) Applicant: Tenneco Automotive Operating Company Inc., Lake Forest, IL (US)

(72) Inventors: Megan Wikaryasz, Ypsilanti, MI (US); Rick Thompson, Jonesville, MI (US); Douglas Otrompke, Ypsilanti, MI (US); Pavel Robles, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 437 days.

(21) Appl. No.: 14/326,739

(22) Filed: Jul. 9, 2014

(65) Prior Publication Data

US 2014/0311137 A1 Oct. 23, 2014

Related U.S. Application Data

(63) Continuation of application No. 13/043,889, filed on Mar. 9, 2011, now Pat. No. 8,776,509.

(51) Int. Cl.
    *F01N 1/00* (2006.01)
    *F01N 3/20* (2006.01)
    *F01N 3/28* (2006.01)
    *F01N 13/00* (2010.01)

(52) U.S. Cl.
    CPC ............ *F01N 3/20* (2013.01); *F01N 3/2066* (2013.01); *F01N 3/28* (2013.01); *F01N 13/017* (2014.06); *F01N 2240/20* (2013.01); *F01N 2610/1453* (2013.01); *Y02T 10/24* (2013.01)

(58) Field of Classification Search
    CPC ........ F01N 13/017; F01N 3/20; F01N 3/2066; F01N 3/28; F01N 2240/20; F01N 2610/1453
    USPC ................... 60/286, 295, 297, 301
    See application file for complete search history.

(56) References Cited

U.S. PATENT DOCUMENTS

| 3,733,181 A | 5/1973 | Tourtellotte |
| 3,948,611 A | 4/1976 | Stawsky |
| 3,987,868 A | 10/1976 | Betts |

(Continued)

FOREIGN PATENT DOCUMENTS

| CN | 1809688 A | 7/2006 |
| CN | 1968806 A | 5/2007 |

(Continued)

*Primary Examiner* — Jason Shanske
*Assistant Examiner* — Matthew T Largi
(74) *Attorney, Agent, or Firm* — Harness, Dickey & Pierce, P.L.C.

(57) ABSTRACT

An exhaust treatment device includes first and second substrates positioned in parallel within a housing. A baffle plate supports the substrates, an inlet tube and an outlet pipe, and defines a portion of a first chamber. First ends of the substrates and a second end of the inlet tube is in fluid communication with the first chamber. A partition supports the substrates, the inlet tube and the outlet pipe and defines a portion of a second chamber separate from first chamber. Second ends of the substrates and a second open end of the outlet pipe is in fluid communication with the second chamber. All of the exhaust flows in a first direction through the inlet tube, reverses direction through the substrates and reverses direction again to flow through the outlet pipe.

24 Claims, 6 Drawing Sheets

(56) References Cited

U.S. PATENT DOCUMENTS

| | | | |
|---|---|---|---|
| 4,109,752 A * | 8/1978 | Ferralli | F01N 1/003 181/206 |
| 4,371,581 A * | 2/1983 | Uchikawa | B01D 53/86 181/204 |
| 4,848,513 A | 7/1989 | Csaszar | |
| 5,055,274 A | 10/1991 | Abbott | |
| 5,220,137 A | 6/1993 | Howerton et al. | |
| 5,243,819 A * | 9/1993 | Woerner | F01N 3/025 55/466 |
| 5,285,640 A | 2/1994 | Olivo | |
| 5,345,762 A | 9/1994 | Lutze | |
| 5,482,681 A | 1/1996 | Sager, Jr. | |
| 5,912,441 A | 6/1999 | Wörner | |
| 6,143,254 A | 11/2000 | Erven et al. | |
| 6,158,214 A | 12/2000 | Kempka et al. | |
| 6,312,650 B1 | 11/2001 | Frederiksen et al. | |
| 6,444,177 B1 * | 9/2002 | Muller | B01D 53/8631 422/172 |
| 6,651,773 B1 | 11/2003 | Marocco | |
| 6,681,889 B2 | 1/2004 | Collmer et al. | |
| 6,712,283 B2 | 3/2004 | Humburg | |
| 6,722,124 B2 | 4/2004 | Pawson et al. | |
| 6,729,127 B2 | 5/2004 | Woerner et al. | |
| 6,770,252 B2 | 8/2004 | Cheng | |
| 6,896,000 B2 | 5/2005 | Brenner et al. | |
| 6,908,595 B1 | 6/2005 | Biel, Jr. et al. | |
| 6,941,749 B1 * | 9/2005 | Noirot | B01D 53/9481 422/169 |
| 7,550,118 B2 | 6/2009 | Merry | |
| 7,614,215 B2 | 11/2009 | Warner et al. | |
| 7,628,011 B2 | 12/2009 | Crawley et al. | |
| 7,797,927 B2 | 9/2010 | Nagaoka et al. | |
| 7,850,934 B2 | 12/2010 | Döring | |
| 7,856,807 B2 | 12/2010 | Gibson | |
| 8,186,058 B2 | 5/2012 | Merry | |
| 8,499,548 B2 * | 8/2013 | De Rudder | F01N 3/2066 60/274 |
| 8,540,793 B2 | 9/2013 | Kasaoka et al. | |
| 2002/0023435 A1 * | 2/2002 | Woerner | F01N 3/023 60/297 |
| 2006/0067860 A1 | 3/2006 | Faircloth et al. | |
| 2006/0188416 A1 * | 8/2006 | Alward | B01D 39/2086 422/180 |
| 2006/0266022 A1 * | 11/2006 | Woerner | F01N 1/08 60/295 |
| 2007/0125594 A1 * | 6/2007 | Hill | F01N 1/084 181/256 |
| 2007/0245722 A1 | 10/2007 | Ruan | |
| 2007/0289294 A1 | 12/2007 | Werni et al. | |
| 2009/0158721 A1 | 6/2009 | Wieland et al. | |
| 2009/0272106 A1 | 11/2009 | Werni et al. | |
| 2010/0212301 A1 | 8/2010 | De Rudder et al. | |
| 2011/0023471 A1 | 2/2011 | Werni et al. | |
| 2011/0146253 A1 | 6/2011 | Isada et al. | |
| 2011/0203692 A1 | 8/2011 | Werni et al. | |
| 2013/0086894 A1 | 4/2013 | Wikaryasz et al. | |

FOREIGN PATENT DOCUMENTS

| | | |
|---|---|---|
| CN | 101578431 A | 11/2009 |
| CN | 101784771 A | 7/2010 |
| EP | 1025923 A1 | 8/2000 |
| EP | 1050670 | 11/2000 |
| EP | 2136044 | 12/2009 |
| JP | 59-062025 U | 4/1984 |
| JP | 01-097022 U | 6/1989 |
| JP | H0917751 A | 1/1997 |
| JP | 2000094050 A | 4/2000 |
| JP | 2004138013 A | 5/2004 |
| JP | 2005155533 A | 6/2005 |
| JP | 2006524777 A | 11/2006 |
| JP | 2007002819 A | 1/2007 |
| JP | 2007532356 A | 11/2007 |
| JP | 3142805 U | 6/2008 |
| JP | 2008274851 A | 11/2008 |
| WO | WO-2009/139333 A1 | 11/2009 |

* cited by examiner

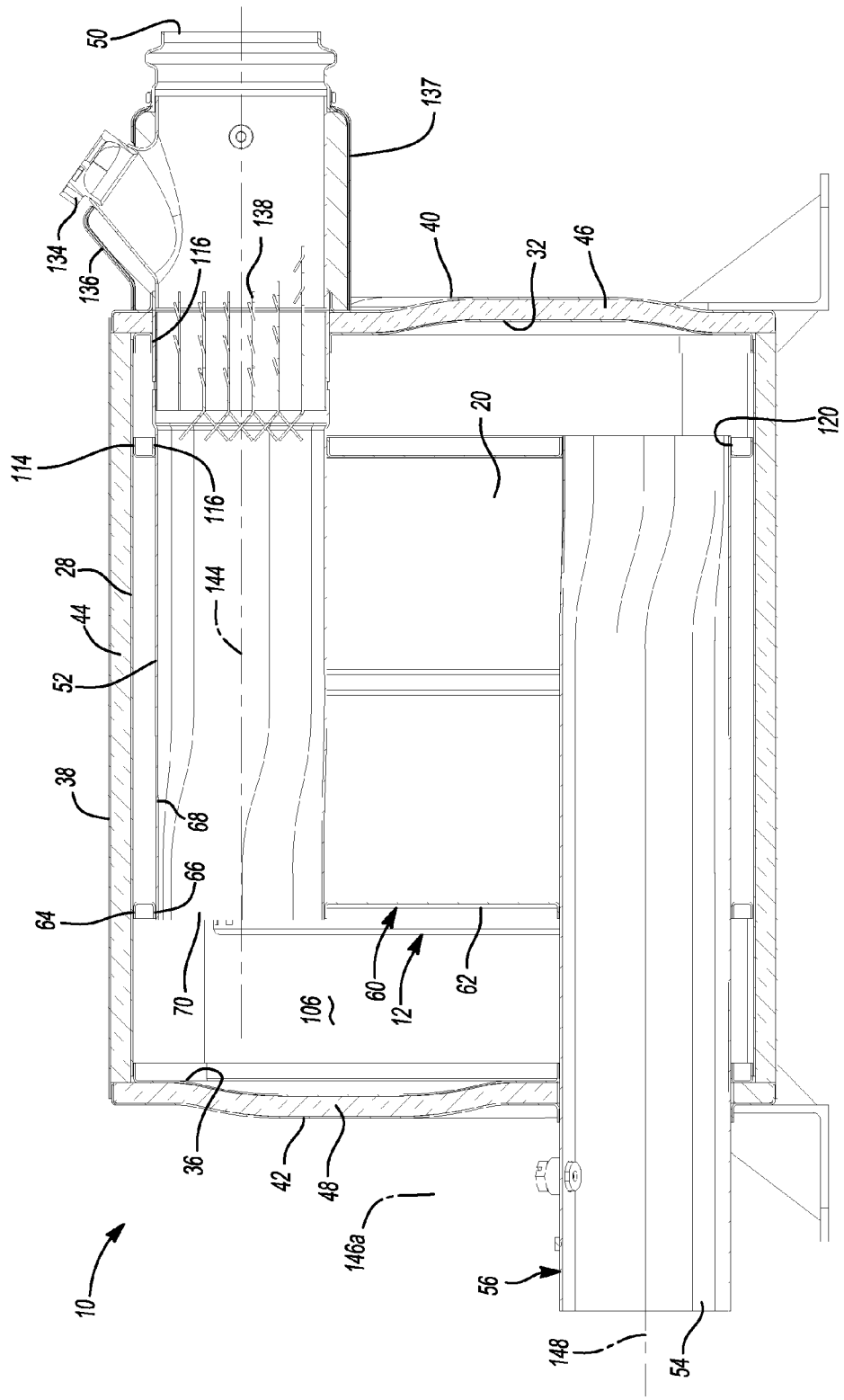

TRI-FLOW EXHAUST TREATMENT DEVICE WITH REDUCTANT MIXING TUBE

CROSS-REFERENCE TO RELATED APPLICATIONS

This application is a continuation of U.S. patent application Ser. No. 13/043,889, filed on Mar. 9, 2011. The entire disclosure of the above application is incorporated herein by reference.

FIELD

The present disclosure relates to an exhaust treatment device for reducing nitrogen oxide emissions from an internal combustion engine and, in particular, to an integral selective catalytic reduction device with decomposition tube.

BACKGROUND

This section provides background information related to the present disclosure which is not necessarily prior art.

Exhaust gas treatment devices such as catalytic converters, diesel oxidation catalysts, diesel particulate filters, and the like, may be employed in various systems to treat exhaust gases emitted from internal combustion engines. Many of the exhaust gas treatment systems include several subcomponents separated by a distance. Furthermore, many of the independent exhaust treatment devices include housings having multiple panels and supports to define different chambers and mount various elements within the exhaust treatment device.

Some of the known exhaust treatment systems include a reductant injector and a reductant decomposition device positioned upstream of a selective catalytic reduction device (SCR). While several known SCR systems have functioned properly in the past, concerns arise regarding controlling the decomposition of urea to ammonia. Many of the prior systems required an upstream decomposition tube wrapped with relatively cumbersome and expensive insulation to retain heat within the tube. Unfortunately, the SCR systems have become relatively large, costly and possible cumbersome.

Furthermore, some exhaust treatment device housings are formed using stamped metal sheets to define split or "clam shell" designs. As such, inner housings and outer housings may be formed from separate clam shell components. Additional stampings may be formed and welded to the clam shells to provide an exhaust inlet, and exhaust outlet and sometimes another inlet for injecting reagents into the exhaust stream. Some exhaust treatment device housings have become relatively complex, costly and difficult to assemble. Accordingly, it may be desirable to provide an improved exhaust treatment device having an integral decomposition tube exhibiting reduced size, cost and complexity.

SUMMARY

This section provides a general summary of the disclosure, and is not a comprehensive disclosure of its full scope or all of its features.

An exhaust treatment device includes first and second substrates positioned in parallel within a housing. A baffle plate supports the substrates, an inlet tube and an outlet pipe, and defines a portion of a first chamber. First ends of the substrates and a second end of the inlet tube is in fluid communication with the first chamber. A partition supports the substrates, the inlet tube and the outlet pipe and defines a portion of a second chamber separate from first chamber. Second ends of the substrates and a second open end of the outlet pipe is in fluid communication with the second chamber. All of the exhaust flows in a first direction through the inlet tube, reverses direction through the substrates and reverses direction again to flow through the outlet pipe.

An exhaust treatment device includes first and second substrates positioned in a parallel flow arrangement within a housing. An inlet tube has a first end positioned outside of the housing and a second open end positioned inside of the housing. An outlet pipe having a first end is positioned outside of the housing and a second open end positioned inside of the housing. A first partition is positioned within the housing and defines a portion of a first chamber. First ends of the substrates and the second end of the inlet tube are in fluid communication with the first chamber. A second partition is positioned within the housing, spaced apart from the first partition, and defines a portion of a second chamber separate from and spaced apart from the first chamber. Second ends of the substrates and the second open end of the outlet pipe are in fluid communication with the second chamber. The inlet tube extends through the second chamber, the first partition, and the second partition, and terminates at the first chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is another sectional view of the exhaust treatment device.

Corresponding reference numerals indicate corresponding parts throughout the several views of the drawings.

DETAILED DESCRIPTION

Figure 1:
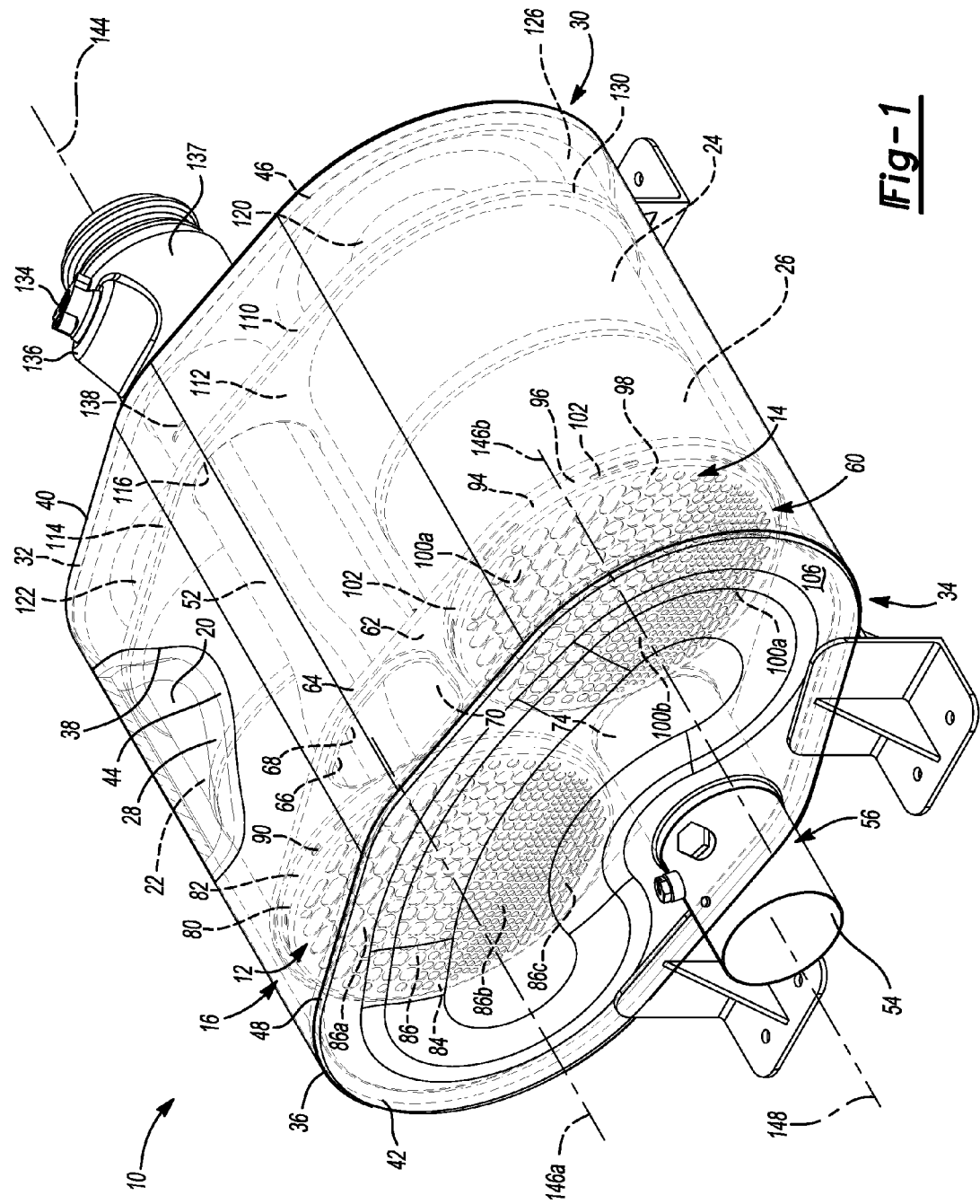
FIG. 1 is a perspective view of an exhaust treatment device constructed in accordance with the teachings of the present disclosure.
Figure 2:
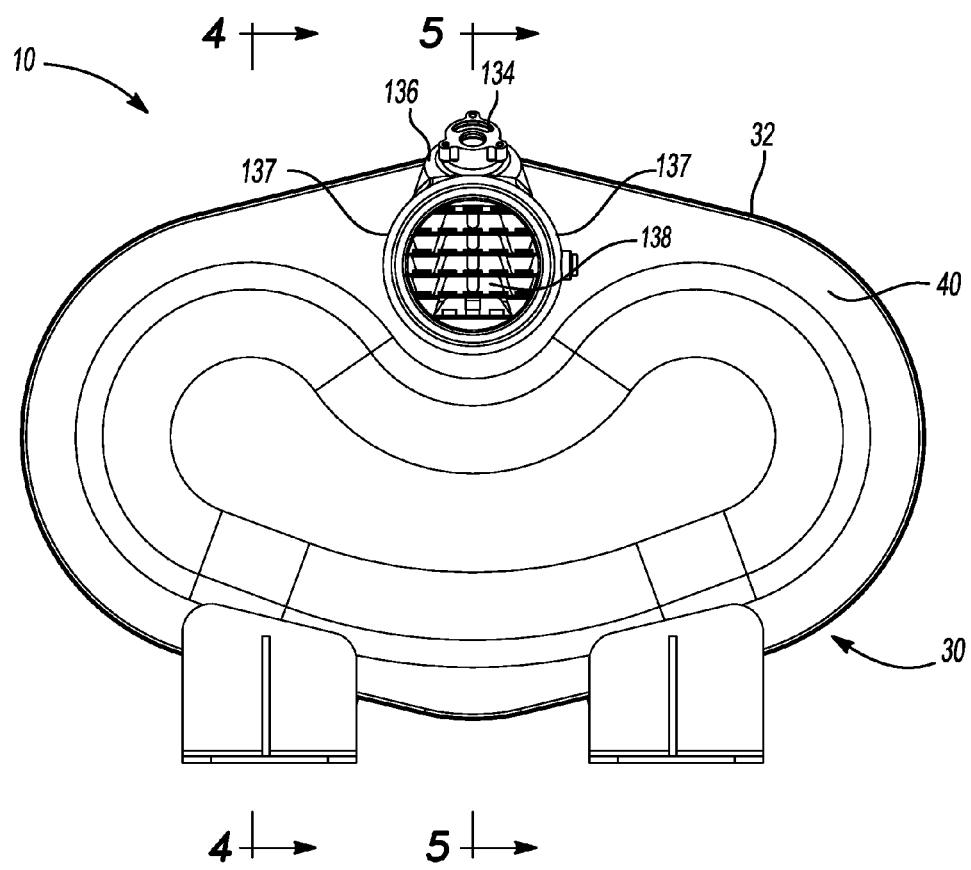
FIG. 2 is another perspective view of the exhaust treatment device.
Figure 3:
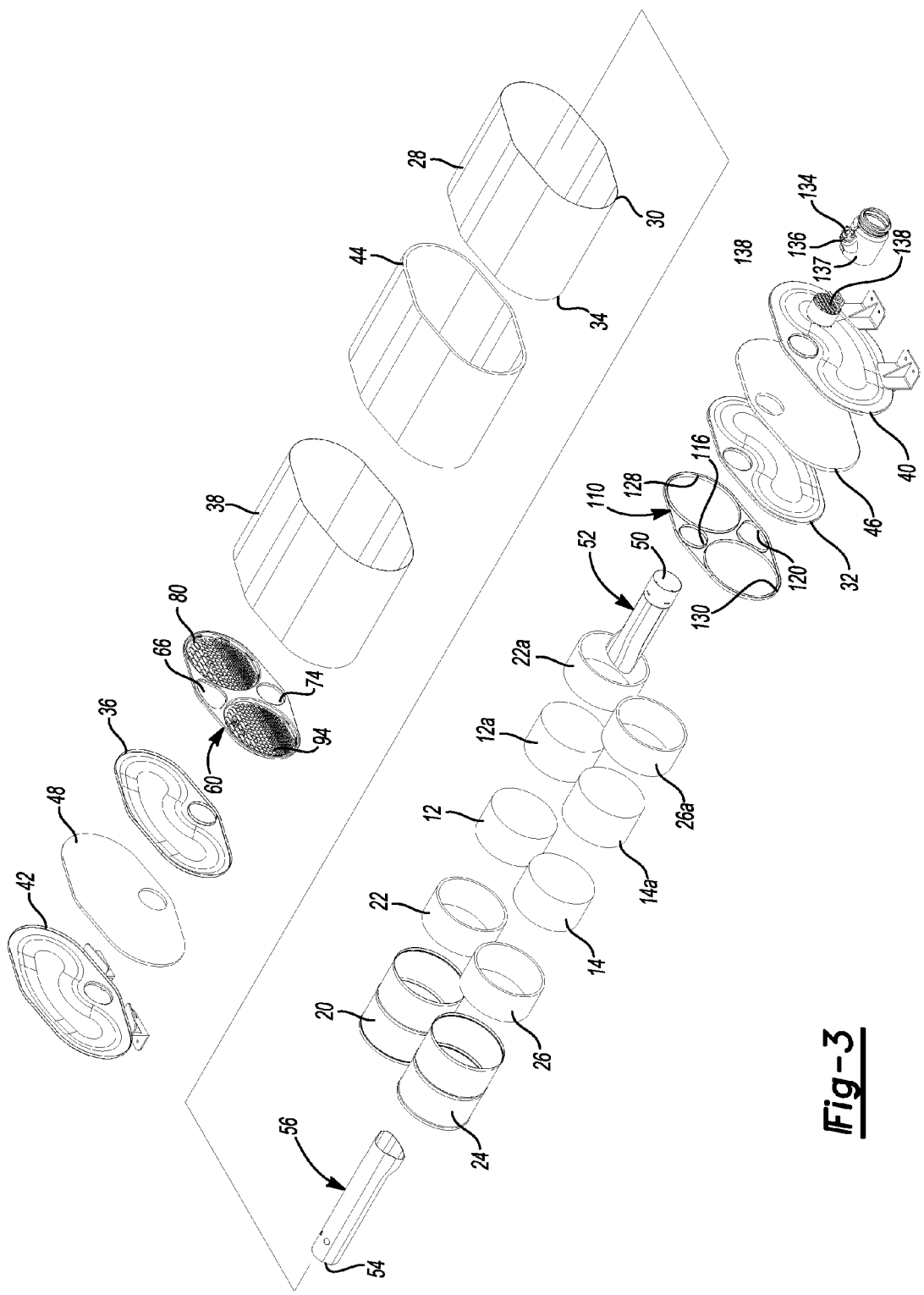
FIG. 3 is an exploded perspective view of the components of the exhaust treatment device.
Figure 4:
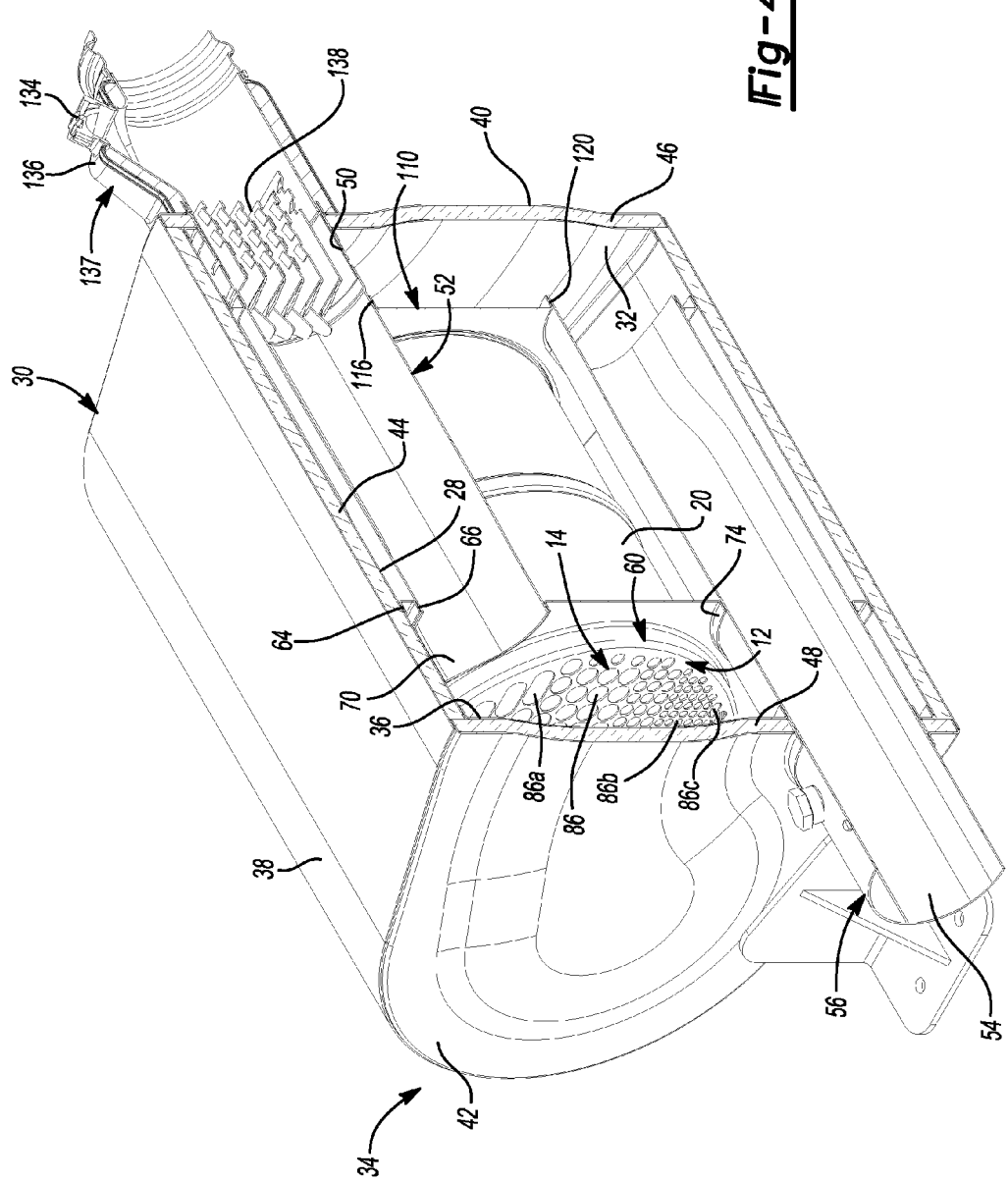
FIG. 4 is a fragmentary sectional view of the exhaust treatment device.
Figure 5:
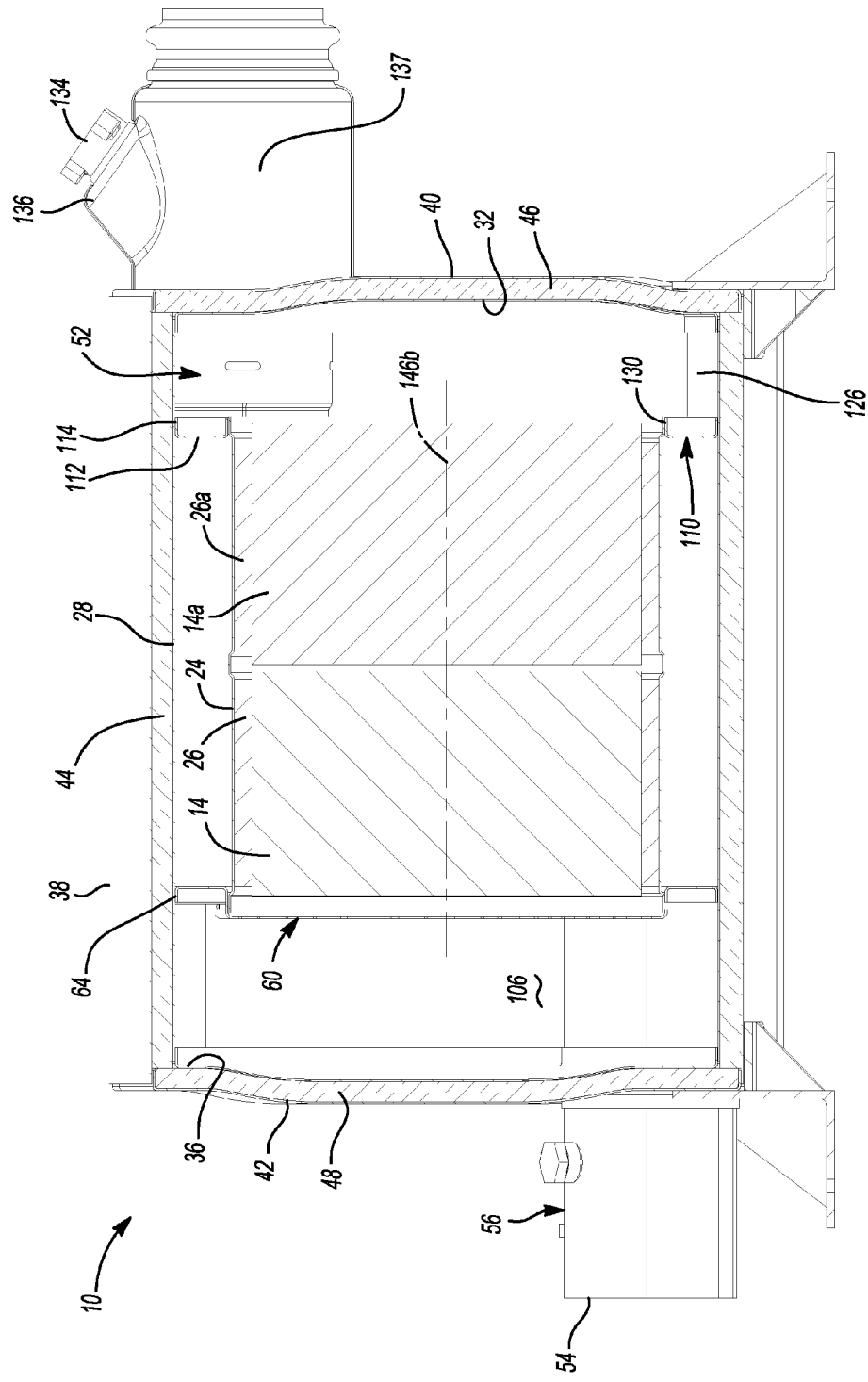
FIG. 5 is a cross-sectional view of the exhaust treatment device taken through the centerline of the inlet tube.

FIGS. 1-6 depict an exemplary exhaust treatment device identified at reference numeral 10. Exhaust treatment device 10 includes a first substrate 12 positioned in parallel with a second substrate 14 within a housing 16. It is contemplated that first substrate 12 and second substrate 14 may be substantially similar to one another and may be constructed as an SCR substrate, or some other type of exhaust treatment component such as a diesel oxidation catalyst, a diesel particulate filter, or the like. First substrate 12 is canned or "stuffed" within a first tube, otherwise identified as a first can 20. A first mat 22 is compressed between an outer cylindrical surface of first substrate 12 and an inner cylindrical surface of first can 20. In similar fashion, second substrate 14 is retained within a second tube, otherwise identified as a second can 24 with a second compressed mat 26 positioned between an outer cylindrical surface of second substrate 14 and an inner surface of second can 24. An optional third substrate 12a and third mat 22a are also mounted within first can 20 downstream from first substrate 12. Similarly, an optional fourth substrate 14a cooperates with a third mat 26a within second can 24.

Housing 16 includes a tubular inner shell 28 capped at a first end 30 by a first inner end plate 32. An opposite end 34 of inner shell 28 is sealed by a second inner end plate 36. A tubular outer shell 38 circumscribes inner shell 28. First end 30 of housing 16 includes a first outer end plate 40 fixed to outer shell 38. At opposite end 34 of housing 16, a second outer end plate 42 is fixed to outer shell 38. An insulation material 44 is positioned between inner shell 28 and outer shell 38. An insulation material 46 is positioned between first outer end plate 40 and first inner end plate 32. Another insulation material 48 is positioned between second outer end plate 42 and second inner end plate 36.

An inlet 50 is formed at one end of a pipe or tube 52 extending through first outer end plate 40 and first inner end plate 32. An outlet 54 is formed at one end of another pipe, otherwise known as an outlet pipe 56 extending through second outer end plate 42 and second inner end plate 36. Tube 52 and outlet pipe 56 extend substantially parallel to and offset from one another.

A baffle plate 60 includes a substantially planar body portion 62 circumferentially surrounded by a peripheral flange 64. Flange 64 is sized and shaped to sealingly engage an inner surface of inner shell 28. A first aperture 66 extending through planar body portion 62 is defined by a flange 68. Flange 68 is in receipt of an end 70 of tube 52. End 70 may be press-fit into flange 68 and/or tube 52 may be welded to flange 68 at this location. A second aperture 74 extends through planar body portion 62 and is in receipt of outlet pipe 56.

Baffle plate 60 includes a first axially protruding boss 80 including a circumferentially extending cylindrical wall 82 intersecting an end face 84 and planar body portion 62. A plurality of apertures 86 extend through end face 84. The apertures vary in size with apertures 86a having a larger diameter than apertures 86b. Apertures 86c have a smaller diameter than apertures 86b. Apertures 86a, having the largest diameter, are positioned at a location closest to end 70 of tube 52 where the exhaust pressure is the lowest. The smallest diameter apertures 86c are positioned furthest from tube 52 where the exhaust pressure is the greatest. The intermediate sized apertures 86b are positioned at a location of intermediate exhaust pressure. By arranging and sizing the apertures in this manner, a substantially consistent flow of exhaust will enter first substrate 12. A plurality of circumferentially spaced apart slots 90 extend through cylindrical wall 82. Baffle plate 60 is welded to first can 20 by welding cylindrical wall 82 through slots 90.

Baffle plate 60 includes a second axially protruding boss 94 that is substantially similar to boss 80. As such, boss 94 includes a cylindrical wall 96, an end face 98 and a plurality of apertures 100a, 100b and 100c. A plurality of circumferentially spaced apart slots 102 extend through cylindrical wall 96. Second boss 94 is welded to second can 24 through slots 102. Baffle plate 60 is positioned within inner shell 28 substantially parallel to and spaced apart from second inner end plate 36. A first cavity or first chamber 106 is defined by baffle plate 60, second inner end plate 36 and inner shell 28. First cavity 106 is in fluid communication with end 70 of tube 52.

A partition 110 includes a substantially planar body portion 112 extending parallel to and spaced apart from first inner end plate 32. A peripheral flange 114 surrounds planar body portion 112 and is sized and shaped to engage an inner surface of inner shell 28. Flange 114 may be coupled to inner shell 28 using a process such as seal welding. Partition 110 includes an aperture 116 in receipt of tube 52. Another aperture 120 extends through partition 110 and is in receipt of an end 122 of outlet pipe 56. A second cavity or second chamber 126 is defined as the volume between partition 110, first inner end plate 32, and inner shell 28. Open end 122 of outlet pipe 56 is in communication with second cavity 126. A first substrate aperture 128 allows fluid communication between first substrate 12 and second cavity 126. A second substrate aperture 130 allows fluid communication between second substrate 14 and second cavity 126.

An injector mounting flange 134 is mounted to a boss 136 formed near inlet 50. An injector (not shown) may be fixed to mounting flange 134. Heat shields 137 may be coupled to a portion of tube 52 that extends outwardly from first inner end plate 32 to minimize heat transfer to the atmosphere from the portion of tube 52 near injector mounting flange 134. An insulation material may be positioned between heat shields 137 and tube 52 to further minimize the heat loss. A mixer 138 is positioned within tube 52 downstream from injector mounting flange 134 to mix injected reductant with exhaust flowing through tube 52. Mixer 138 and tube 52 extend a length sufficient to properly vaporize the injected reductant. By positioning tube 52 within inner shell 28, reductant decomposition occurs within an insulated environment. Furthermore, tube 52 extends approximately three-quarters to seven-eighths of the overall length of exhaust treatment device 10. The packaging of tube 52 within insulated housing 16 eliminates the need for external insulation on a decomposition tube that would be externally mounted from the SCR device.

It should be appreciated that a substantial quantity of exhaust flow may be treated through the use of parallel arranged substrates 12, 14. Enhanced exhaust and reductant mixing is assured through the use of a tri-flow arrangement. A first axis of flow is defined by tube 52. Exhaust flows into inlet 50 along a first axis 144 exiting end 70 to enter first cavity 106. The exhaust and reductant flow are reversed in direction 180 degrees to pass through either first substrate 12 along an axis 146a or through second substrate 14 along a flow axis identified as 146b. Axes 146a, 146b extend substantially parallel to and offset from axis 144. Treated exhaust exits first substrate 12 and second substrate 14 through first substrate aperture 128 and second substrate aperture 130 to enter second cavity 126. The exhaust is forced to change direction 180 degrees once again and enter open end 122 of outlet pipe 56. The exhaust flows along a third axis 148 and exits exhaust treatment device 10 at outlet 54. The use of parallel exhaust flow paths as previously described allows for a reduced overall length of exhaust treatment device 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment device, comprising:
   a housing;
   an exhaust treatment component positioned in the housing;
   a tube having a first end positioned inside of the housing, the first end of the tube terminating at a first end face;
   a baffle plate supporting the first end of the tube, the baffle plate and a portion of the housing defining a first chamber, the baffle plate extending across and overlapping the first end face of the tube and including apertures placing an interior volume of the tube in fluid communication with the first chamber; and
   a partition and another portion of the housing defining a second chamber separate from and spaced apart from the first chamber, an end of the exhaust treatment component being in fluid communication with the second chamber, wherein exhaust flowing through the treatment device flows in a first direction through the tube and in a reverse direction when flowing through the housing at a location outside of the tube.

2. The exhaust treatment device of claim 1, wherein the tube contains the exhaust treatment component.

3. The exhaust treatment device of claim 2, wherein the exhaust treatment component is a catalyst substrate.

4. The exhaust treatment device of claim 3, further including a compressible material surrounding the catalyst substrate and positioned within the tube.

5. The exhaust treatment device of claim 1, further including a pipe including a first end positioned within the second chamber and a second end positioned outside of the housing.

6. The exhaust treatment device of claim 5, wherein the pipe and the tube extend parallel to one another.

7. The exhaust treatment device of claim 5, further including another pipe having a first end positioned within the first chamber and a second end positioned outside of the housing.

8. The exhaust treatment device of claim 7, wherein the pipe extends through the second chamber without being in direct fluid communication with the second chamber.

9. The exhaust treatment device of claim 8, wherein the another pipe extends through the first chamber without being in direct fluid communication with the first chamber.

10. The exhaust treatment device of claim 5, wherein the pipe extends along an entire length of the exhaust treatment component.

11. The exhaust treatment device of claim 5, wherein the pipe extends through an aperture in the baffle plate.

12. The exhaust treatment device of claim 1, wherein the first and second chambers are positioned at opposite ends of the housing.

13. The exhaust treatment device of claim 1, wherein the partition supports the tube.

14. The exhaust treatment device of claim 1, further including an injector mount for supporting a reagent injector, the mount being coupled to the housing.

15. The exhaust treatment device of claim 14, further including a mixer downstream of the injector mount.

16. An exhaust treatment device, comprising:
    a tubular body including a wall;
    an end plate enclosing one end of the tubular body and being coupled to the wall;
    an exhaust treatment component positioned in the tubular body;
    a baffle plate, the end plate and a portion of the tubular body defining a first chamber;
    a first tube having a first end positioned inside of the tubular body, the first end of the first tube terminating at a first end face, the baffle plate extending across and overlapping the first end face of the first tube and including apertures placing an interior volume of the first tube in fluid communication with the first chamber; and
    a second tube having a first end positioned in fluid communication with the first chamber, the baffle plate supporting the first end of the second tube, wherein exhaust flows through the first tube and the second tube in opposite directions.

17. The exhaust treatment device of claim 16, wherein the exhaust treatment component is positioned within the first tube.

18. The exhaust treatment device of claim 17, wherein the baffle plate includes a protrusion including a circumferentially extending wall coupled to the first tube.

19. The exhaust treatment device of claim 18, wherein the circumferentially extending wall surrounds a portion of the baffle plate containing the apertures.

20. The exhaust treatment device of claim 16, further including a partition supporting the exhaust treatment component and another end plate enclosing another end of the tubular body, the partition and the another end plate defining a second chamber through which exhaust flows.

21. The exhaust treatment device of claim 20, wherein the baffle plate also supports the exhaust treatment component.

22. The exhaust treatment device of claim 21, wherein the second tube extends through the baffle plate and the partition.

23. The exhaust treatment device of claim 16, wherein the first end of the second tube extends into the first chamber.

24. The exhaust treatment device of claim 16, wherein the wall of the tubular body and the end plate each include a constant thickness.

* * * * *